United States Patent
Ramirez et al.

(10) Patent No.: US 7,467,207 B1
(45) Date of Patent: Dec. 16, 2008

(54) BALANCING COMMUNICATION LOAD IN A SYSTEM BASED ON DETERMINATION OF USER-USER AFFINITY LEVELS

(75) Inventors: Jessica W. Ramirez, Danbury, CT (US); Timothy P. Winkler, Meriden, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/024,162

(22) Filed: Feb. 1, 2008

(51) Int. Cl.
 *G06F 15/173* (2006.01)
 *G06F 12/00* (2006.01)
(52) U.S. Cl. ............... 709/226; 718/105
(58) Field of Classification Search ............... 709/226, 709/227, 228, 229; 718/105
See application file for complete search history.

(56) References Cited

U.S. PATENT DOCUMENTS

| | | | |
|---|---|---|---|
| 6,424,992 | B2 | 7/2002 | Devarakonda et al. |
| 2002/0143953 | A1 | 10/2002 | Aiken, Jr. |
| 2002/0143965 | A1 | 10/2002 | Aiken, Jr. |
| 2004/0205250 | A1* | 10/2004 | Bain et al. ............ 709/249 |
| 2004/0215737 | A1* | 10/2004 | Della Pasqua ......... 709/207 |
| 2004/0250248 | A1* | 12/2004 | Halpern et al. ........ 718/100 |
| 2004/0260745 | A1 | 12/2004 | Gage et al. |
| 2004/0268358 | A1* | 12/2004 | Darling et al. ........ 718/105 |
| 2007/0043842 | A1 | 2/2007 | Chouanard et al. |
| 2008/0065652 | A1* | 3/2008 | McCann et al. ........ 707/100 |

* cited by examiner

*Primary Examiner*—Zarni Maung
(74) *Attorney, Agent, or Firm*—Cantor Colburn LLP; Ayla A. Lari

(57) ABSTRACT

A method of balancing communication load in a system running a communication application is provided and includes recognizing that a first user logs onto the communication application via a client and that a communication is issued to one or more other users by the client on behalf of the first user, checking whether user-user affinity data exists for the first user, if the user-user affinity data does not exist, managing the communication application to handle the communication in accordance with predetermined load balancing procedures, monitoring subsequent communications, generating the non-existing user-user affinity data for the first user, in response to a current communication, analyzing the stored user-user affinity data to determine affinity priorities of the first user with respect to the other users, and sending the current communication based on a result of the analysis.

3 Claims, 3 Drawing Sheets

BALANCING COMMUNICATION LOAD IN A SYSTEM BASED ON DETERMINATION OF USER-USER AFFINITY LEVELS

BACKGROUND OF THE INVENTION

1. Field of the Invention

Aspects of the present invention relate to a method of balancing communication load and, more particularly, to a method of balancing communication load in a system based on a determination of user-user affinity levels.

2. Description of the Background

In a server environment or system, it is known that multiple users may log onto communication applications run by the servers via clients and may issue communications, such as requests and/or updates, in accordance with the operation of the communication application. When this occurs, it becomes necessary for the system to monitor and spread those communications across different servers so as to prevent a single server from becoming bogged down with an excess of communications to handle given its processing resources. Load balancing methods have been observed to be somewhat effective methods of controlling the monitoring and the spreading of those communications across different servers.

In general, load balancing in a system is usually provided by software installed on the system or hardware in a network and refers to a technique of spreading work between two or more servers, computers, network links, CPUs, hard drives, or other resources so as to achieve optimal resource utilization, throughput and/or response time for the system. The use of multiple components with load balancing in a system may increase reliability of the system through effects of redundancies therein.

In particular, load balancing may refer to methods of balancing loads across a plurality of servers, including distributing client requests equally among different servers, or determining network proximities so as to send a request to a server to which the request originating client is geographically close. While, these methods may solve problems with balancing network traffic and CPU load, issues in synchronizing data between the servers in order to provide up to date information back to clients remain.

In an example, an instant messaging server environment may have 3 servers to which clients connect. User 1 and User 2 are located in different parts of the world but only send instant messages to each other and only receive online status updates from each other. Using a typical load balancing approach, User 1 and User 2 may end up connecting to different servers, which would then need to synchronize data between each other in order for the User 1 and the User 2 to receive up to date information.

SUMMARY OF THE INVENTION

In accordance with an embodiment of the invention, a method of balancing communication load in a system running a communication application is provided and includes recognizing that a first user logs onto the communication application via a first client, which communicates with a first server, and that a communication is issued to one or more other users by the first client on behalf of the first user, checking whether user-user affinity data exists for the first user with respect to the one or more other users, if the user-user affinity data does not exist, managing the communication application to handle the communication in accordance with predetermined load balancing procedures, monitoring subsequent communications issued to the one or more other users on behalf on the first user by the first and/or another client in communication with the first and/or another server, generating the non-existing user-user affinity data for the first user with respect to the one or more other users as being based upon the monitored subsequent communications and upon server addresses associated with each of the other users, storing the generated user-user affinity data, in response to a current communication issued to the one or more other users on behalf of the first user, analyzing the stored user-user affinity data to determine affinity priorities of the first user with respect to the other users in accordance with a number of times each of the other users is targeted in a communication, and sending the current communication directly to a server, which is identified by one of the server addresses and which is currently associated with the one currently logged on other user for whom the first user has a highest affinity priority.

Additional features and advantages are realized through the techniques of the present invention. Other embodiments and aspects of the invention are described in detail herein and are considered a part of the claimed invention. For a better understanding of the invention with advantages and features, refer to the description and to the drawings,

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
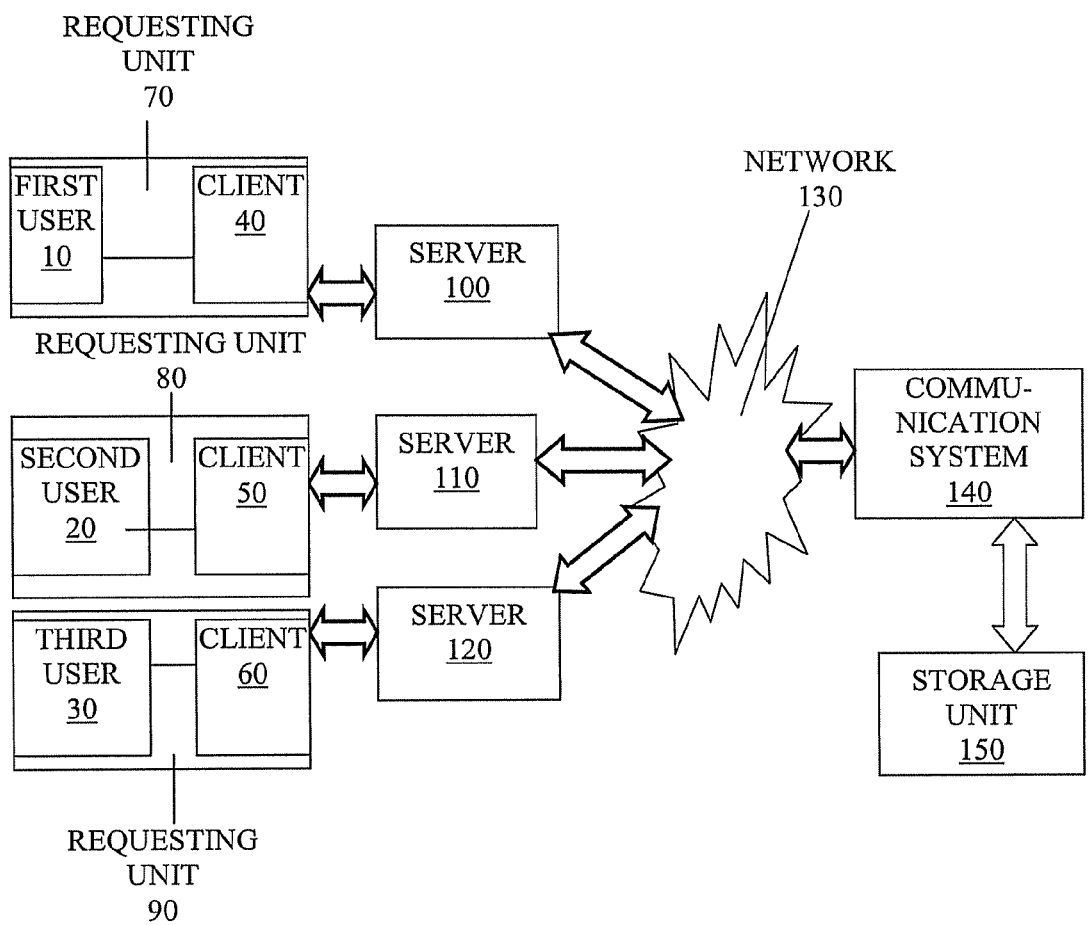
FIG. 1 is a schematic diagram of a system in which a communication application is operated in accordance with an exemplary embodiment of the invention.
Figure 2:
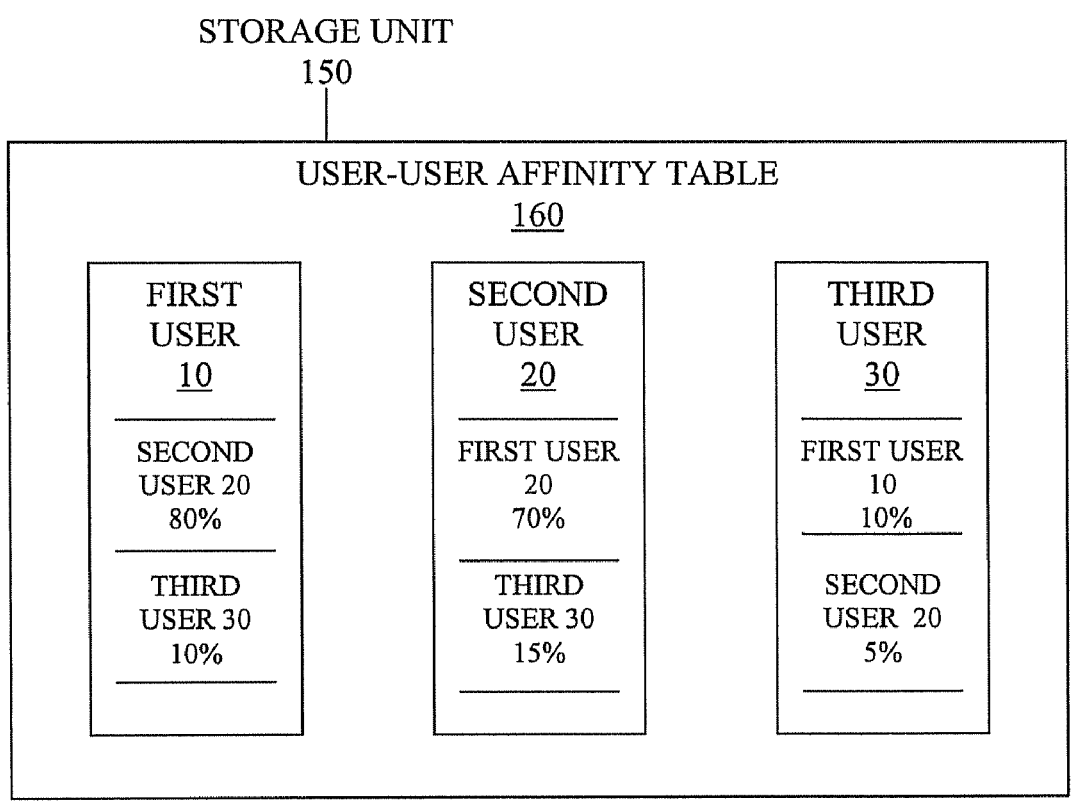
FIG. 2 is an illustration of an exemplary user-user affinity table for use by the communication application of FIG. 1.
Figure 3:
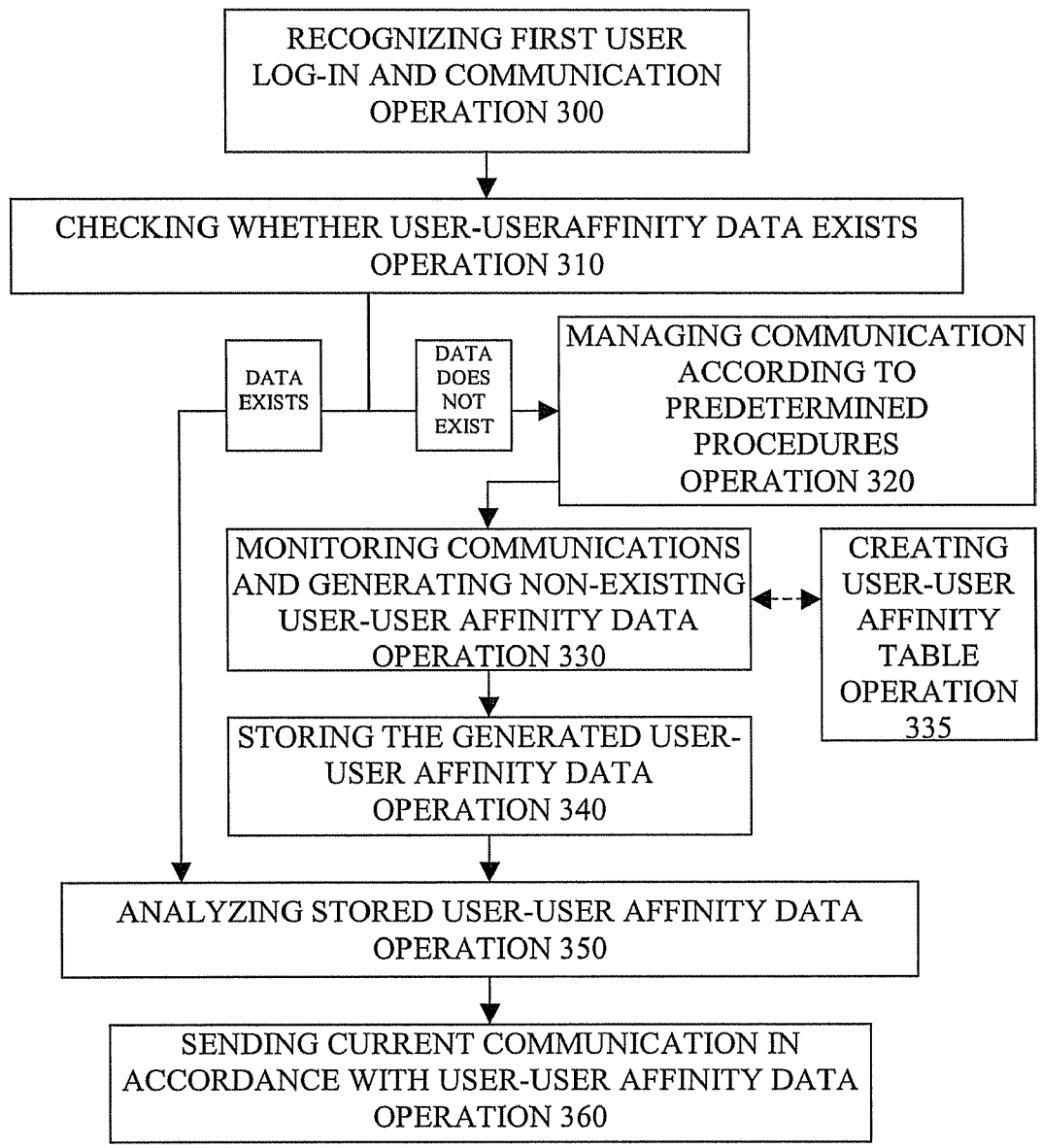
FIG. 3 is a flow diagram of a method of operating a communication application in accordance with an exemplary embodiment of the invention.

With reference to FIGS. 1-3, a method of operating a communication application is provided herein and may be applied for use with a communication system 140, which is illustrated in FIG. 1. As shown in FIG. 1, a first user 10, a second user 20 and a third user 30 each access the communication system 140. Each user interacts, at least initially, with respective clients 40, 50 and 60, which may include communication applications, such as instant messaging (IM) applications. In this manner, the requesting units 70, 80 and 90, which each include a user/client pair, may allow the user to log into the communication system 140 and to issue requests and/or updates (hereinafter referred to as "communications") to other user/client pairs.

In an embodiment of the invention, and particularly, where IM applications are in use, the communications may include requests for status updates of the various users and the updates may be updates issued by and relating to each user. That is, the requesting unit 70 may, for example, request status updates regarding the online status of the second and third users 20 and 30 on behalf of the first user 10.

Servers 100, 110 and 120 allow the users to connect to the network 130 and to one another, when logging into the communication system 140. The servers 100, 110 and 120 may include any computing apparatus capable of connecting to the network 130. Meanwhile, it is understood that the network refers to the Internet, wide area networks (WANs), local area networks (LANs) or any other similar networks that are capable of allowing the users to communicate with each other.

Here, it is noted that, while the first user 10 is shown as being associated with the client 40 and the server 100, the first user 10 may log into the communication application 140 via various clients and various servers. The same is true for the second user 20 and the third user 30. It is, therefore, an aspect of the invention that communications of the users when they use the various clients and servers to log into the communication application 140 will be monitored with respect to the users themselves and not to the particular clients and servers they use during any one session, as will be discussed later.

The communication system 140 monitors the use of the communication application(s) by the users. To this end, the communication system 140 includes a storage unit 150 in which user-user affinity data for each of the users may be stored. The user affinity data may include a record of all of the communications (e.g., the requests and/or updates) made by and/or from a particular user to the other users as well as server addresses of the various severs that may be accessed by the users. The user-user affinity data may also include a record of all of the communications made by and/or from a particular user/client pair with respect to the other users.

With reference to FIG. 2, it is noted that, in an embodiment of the invention, the user-user affinity data records may be combined to generate a user-user affinity table 160 in which each user's communication frequency with the other users is ranked. Thus, as shown in FIG. 2, the first user 10 is shown as having greater user-user affinity toward the second user 20 in view of the fact that 80% of his/her communications were related to the second user. Similar user-user affinities are provided for the second user 20 and the third user 30.

With reference now to FIG. 3, a method of operating a communication application in accordance with the communication system 140, described above, will be discussed. As shown in FIG. 3, the method includes recognizing that a first user 10 logs onto the communication application via a client 40 on a server 100 and that a communication is issued to one or more other users by the first client on behalf of the first user (operation 300). At this point, whether user-user affinity data exists for the first user 10 with respect to the one or more other users is checked (operation 310).

If the user-user affinity data does not exist, the communication application is managed to handle the request in accordance with predetermined load balancing procedures (operation 320). In various embodiments of the invention, these procedures may include the balancing of loads across a multitude of servers, distributing client requests equally among different servers, or determining network proximity to send a request to a server to which the request originating client is geographically close. In still other embodiments of the invention, the procedures may not involve load balancing at all and may be defined in accordance with, e.g., particular user instructions or inputs.

With the communications managed in operation 320, subsequent communications issued on behalf of the first user 10 are monitored for a predetermined period of time during which the heretofore non-existing user-user affinity data for the first user 10 with respect to the one or more other users is generated (operation 330) and stored (operation 340). This generated user-user affinity data is based upon the monitored subsequent requests and server addresses associated with the respective intended target users of the subsequent communications.

In embodiments of the invention, the generation of the user-user affinity data in operation 330 may include the creation of a user-user affinity table 160 (operation 335), as discussed above, which would provide for a ranking of each user's communication frequency with the other users. In further embodiments of the invention, the predetermined period of time is based on an estimated time required for the user-user affinity table 160 to be populated with user-user affinity data for each of the other targeted users.

Once the user-user affinity data for the first user 10, is generated and stored, the stored user-user affinity data is analyzed in response to, e.g., a current communication, such as or request issued to the one or more other users and made by or on behalf of the first user 10 (operation 350). This analysis determines, among other things, user-user affinity priorities of the first user 10 with respect to the other users. That is, if the first user 10 is found to have a user-user affinity with the second user 20 because most of the first user 10's communications relate to the second user 20, it is determined that the user-user affinity priority of the second user 20 is highest with respect to the first user 10. Here, it is noted that, in an embodiment of the invention, the determination of the user-user affinity priority between the first user 10 and the second user 20 is based on the user-user affinity the users have toward one another and may be independent of the client s and the servers the users employ during various sessions with the communication system 140.

Where it is determined that a particular user, in this case, the second user 20 has the highest user-user affinity priority with respect to the first user 10, the current communication is automatically sent to the server 110 to which the second user 10 is currently connected to. If, however, the second user 20 is not currently connected, the current communication is automatically sent to the server to which the user with the next highest priority is known to connect to. In another embodiment, the current communication may be sent to a server according to predetermined load balancing procedures.

As such, since communications will not be sent to remote or otherwise out-of-the-way servers, communications from one user to another and vice versa will be handled more efficiently. Similarly, certain communications, such as status updates as to a particular user's status, which will be treated in a similar fashion. As such, they will be received and recognized by highly affinitive users more quickly than those users would received them otherwise.

As an additional matter, it is noted that, if the user-user affinity data is found to exist after the checking of the existence of the user affinity data in operation 310, the analyzing of operation 350 is immediately undertaken. That said, communications of the users may still be continuously monitored so as to provide for an option of real-time updating of the user affinity data, if necessary.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A method of balancing communication load in a system running a communication application, comprising:

recognizing that a first user logs onto the communication application via a first client, which communicates with a first server, and that a communication is issued to one or more other users by the first client on behalf of the first user;

checking whether user-user affinity data exists for the first user with respect to the one or more other users;

if the user-user affinity data does not exist, managing the communication application to handle the communication in accordance with predetermined load balancing procedures;

monitoring subsequent communications issued to the one or more other users on behalf on the first user by the first and/or another client in communication with the first and/or another server;

generating the non-existing user-user affinity data for the first user with respect to the one or more other users as being based upon the monitored subsequent communications and upon server addresses associated with each of the other users;

storing the generated user-user affinity data;

in response to a current communication issued to the one or more other users on behalf of the first user, analyzing the stored user-user affinity data to determine affinity priorities of the first user with respect to the other users in accordance with a number of times each of the other users is targeted in a communication; and sending the current communication directly to a server, which is identified by one of the server addresses and which is currently associated with the one currently logged on other user for whom the first user has a highest affinity priority.

2. The method according to claim 1, wherein the communication application comprises an instant messaging service.

3. The method according to claim 1, wherein the generating of the non-existing user-user affinity data comprises creating a user-user affinity table including information relating to each of the other users, and wherein the monitoring occurs over a predetermined period of time during which the user-user affinity table is populated.

* * * * *